United States Patent
Aoki

[19]

[11] Patent Number: 5,889,621
[45] Date of Patent: Mar. 30, 1999

[54] OPTICAL LOW PASS FILTER

[75] Inventor: Norihiko Aoki, Sagamihara, Japan

[73] Assignee: Olympus Optical Co., Ltd., Tokyo, Japan

[21] Appl. No.: 795,017

[22] Filed: Feb. 5, 1997

[30] Foreign Application Priority Data

Feb. 6, 1996 [JP] Japan ................................. 8-042176

[51] Int. Cl.$^6$ .......................... G02B 13/18; G02B 27/44; G02B 13/08
[52] U.S. Cl. .......................... 359/708; 359/566; 359/652; 359/668
[58] Field of Search .................................. 359/708–719, 359/652–654, 668, 566, 568

[56] References Cited

U.S. PATENT DOCUMENTS

| | | | |
|---|---|---|---|
| 5,450,243 | 9/1995 | Nishioka | 359/710 |
| 5,463,496 | 10/1995 | Ise | 359/497 |
| 5,471,344 | 11/1995 | Sugawara | 359/566 |

FOREIGN PATENT DOCUMENTS 5-64326   9/1993   Japan .

*Primary Examiner*—Scott J. Sugarman
*Attorney, Agent, or Firm*—Pillsbury Madison & Sutro LLP

[57] ABSTRACT

An optical low pass filter having an optical axis common to an imaging optical system or configured as a portion of an imaging optical system for contribution to formation of an image, functioning to image components in a longitudinal direction of the image pickup device onto a desired imaging location and having refractive powers, for components in different directions, which are different from that for the components in the longitudinal direction. This optical low pass filter is suited for use with line sensors.

18 Claims, 3 Drawing Sheets

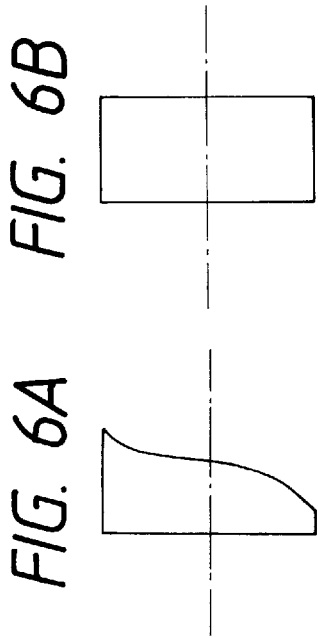
FIG. 5A  FIG. 5B  FIG. 6A  FIG. 6B
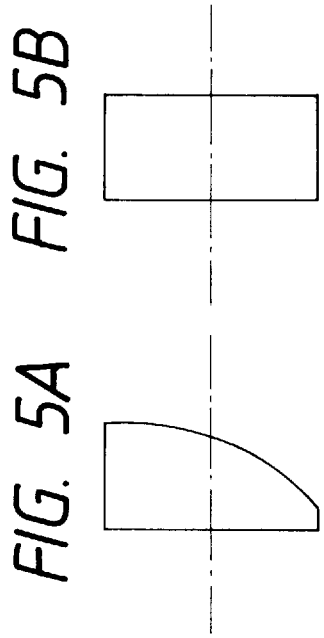
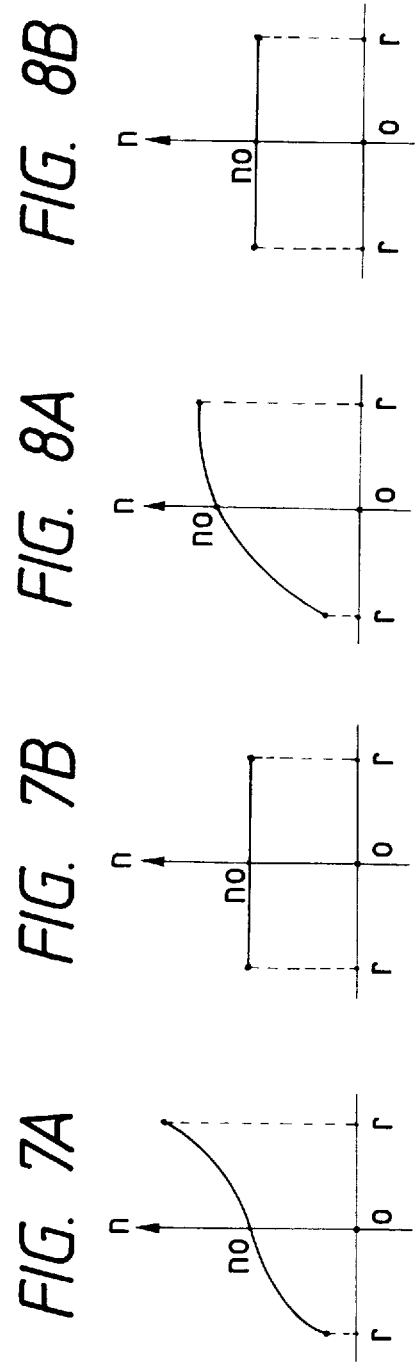
FIG. 7A  FIG. 7B  FIG. 8A  FIG. 8B

OPTICAL LOW PASS FILTER

BACKGROUND OF THE INVENTION a. Field of the Invention

The present invention relates to an optical low pass filter to be used in optical systems which use solid-state image pickup devices for obtaining output information by distributedly sampling image information, and more specifically to an optical low pass filter suited for use in optical systems which use one-dimensional solid-state image pickup devices, or, so-called line sensors.

b. Description of the Prior Art

In an optical system which uses a solid-state image pickup device such as a CCD for obtaining output information by distributedly sampling image information, signals picked up and output by the solid-state image pickup device contain spurious signals which are not originally from an object when the object comprises components having spatial frequencies higher than the sampling frequency of the solid-state image pickup device. In other words, components which have spatial frequencies higher than the Nyquist frequency and cannot be picked up by the solid-state image pickup device, are output as moiré, thereby constituting a cause for remarkable degradation of image quality.

Accordingly, the optical system described above conventionally adopts a method to use, as a portion of its image pickup optical system, an optical low pass filter for limiting the components having the high spatial frequencies of the object which are to be input into the solid-state image pickup device. This method is roughly divided into a method which obtains a low pass effect by separating an image point in a direction perpendicular to an optical axis with a birefringent uniaxial crystal such as quartz or a phase filter utilizing a diffraction phenomenon and another method which obtains a low pass effect by defocusing a lens component so as to cut off the components having the high frequencies.

However, the former method increases the manufacturing cost of the optical system since quartz is very expensive and the phase filter requires high manufacturing precision. Further, the latter method makes it difficult to obtain sufficient imaging performance since components having low frequencies are remarkably degraded when the components that have high frequencies are cut off with the defocused lens component.

Furthermore, a general low pass filter is configured based on a premise that it is to be used with a two-dimensional image pickup device and has a composition which is not always optimum for a one-dimensional image pickup device, or, the so-called line sensor.

SUMMARY OF THE INVENTION

A primary object of the present invention is to provide an optical low pass filter which is suited for use in optical systems using one-dimensional solid-state image pickup devices or the so-called line sensors, can be manufactured at a low cost, and has a simple composition and nevertheless permits obtaining a desired low pass effect.

The optical low pass filter according to the present invention has a first composition that is characterized in that it is configured so as to have an optical axis that is common to an imaging optical system or as a portion of an imaging optical system so that it contributes to formation of an image of an object and it images components in a longitudinal direction of an image pickup device onto a desired imaging location and has refractive powers, for components in different directions, which are different from refractive powers for the components in the longitudinal direction or image components having optional spatial frequencies onto different imaging locations.

The optical low pass filter according to the present invention has a second composition that is characterized in that it is configured so as to have an optical axis common to an imaging optical system using a one-dimensional image pickup device or as a portion of an imaging optical system so that it contributes to formation of an image of an object and that it is composed of a member which enables one to differentiate angles of incidence of rays from angles of emergence only in a longitudinal direction of the image pickup device.

BRIEF DESCRIPTION OF THE DRAWINGS

FIGS. 5A and 5B show sectional views illustrating sectional shapes of a cylindrical lens component to be used in the optical low pass filter according to the present invention which has the second composition;

FIGS. 6A and 6B show sectional views illustrating sectional shapes of another cylindrical lens component to be used in the optical low pass filter according to the present invention which has the second composition;

FIGS. 7A and 7B show graphs illustrating refractive index distributions of a gradient index type optical element to be used in the optical low pass filter according to the present invention which has the second composition; and FIGS. 8A and 8B show graphs illustrating refractive index distributions of another gradient index type optical element to be used in the optical low pass filter according to the present invention which has the second composition.

DETAILED DESCRIPTION OF THE PREFERRED EMBODIMENTS

Figure 1A:
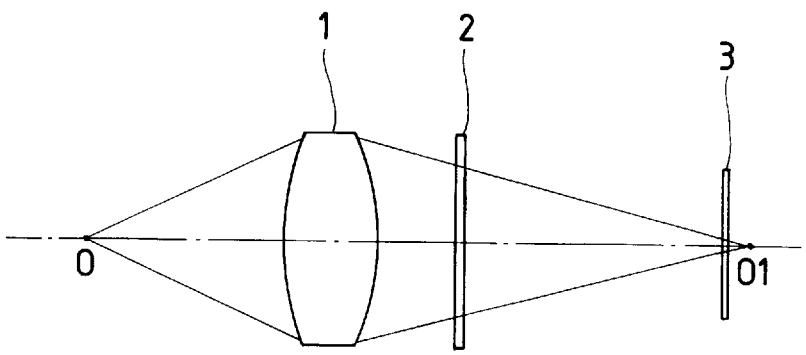
FIGS. 1A and 1B show sectional views illustrating a first composition of the optical low pass filter according to the present invention.

The optical low pass filter according to the present invention which has a first composition is characterized in that it is configured so as to have an optical axis common to an imaging optical system or as a portion of an imaging optical system so that it contributes to formation of an image of an object, and that it images components in a longitudinal direction of an image pickup device at a desired imaging location and has refractive powers, for components in different directions, which are different from the refractive powers for the components in the longitudinal direction or images components having optional spatial frequencies at different imaging locations.

First, description will be made of a method to obtain a low pass effect for the components in the longitudinal direction of the image pickup device and the components in a direction perpendicular to the longitudinal direction.

An optical system into which two-dimensional image information is input through a one-dimensional solid-state image pickup device, or the so-called line sensor, is referred to as a scanner and generally receives the image information while scanning an object and the image pickup device itself in the longitudinal direction of the one-dimensional image pickup device and another direction perpendicular thereto. Accordingly, performance in the direction perpendicular to the longitudinal direction of the image pickup device has less influence on the quality of received image information as a whole than performance in the longitudinal direction.

The optical low pass filter according to the present invention is configured to obtain a desired low pass effect by configuring it so as to have refractive powers which are different between the longitudinal direction of the image pickup device and the direction perpendicular thereto or image components having optional spatial frequencies at different imaging locations. In other words, the optical low pass filter according to the present invention which has the optical axis common to the imaging optical system into which the image information is input or is configured as a portion of the imaging optical system so that it contributes to formation of an image of an object makes it possible to obtain a desired low pass effect at the imaging location for the components in the longitudinal direction of the image pickup device with highly resolved components in the longitudinal direction and defocused components in the perpendicular direction while maintaining a favorable performance of the optical system. The optical system is characterized in that it receives an input image at a location that is different from the imaging location for the components in the longitudinal direction of the image pickup device and that a distance as measured from the location for receiving the input image to the imaging location for the components in the longitudinal direction of the image pickup device is shorter than a distance as measured from the location for receiving the input image to an imaging location for the components in the direction perpendicular to the longitudinal direction.

Accordingly, the optical low pass filter according to the present invention can exhibit a desired low pass effect while suppressing, at a sufficiently low level, the degradation of performance of components themselves, that of components having low frequencies in particular, which is unavoidable when a low pass effect is obtained simply by defocusing components with a two-dimensional image pickup device. At the same time, the optical low pass filter according to the present invention permits enhancing resolution in a scanning direction by selecting an optimum scanning speed in the direction perpendicular to the longitudinal direction.

Speaking concretely, it is sufficient for this purpose to configure the optical low pass filter composing a portion of the imaging optical system or having the optical axis common to the imaging as an anamorphic optical system and aligning the longitudinal direction of the one-dimensional image pickup device with an axis of a coordinate system on an anamorphic surface thereof. In this case, it is possible to effectively lower MTFs for components having desired spatial frequencies at the imaging location in the longitudinal direction by optimalizing a surface in the direction perpendicular to the longitudinal direction. This effect can further be enhanced by using an aspherical surface to obtain freedom for aberration correction.

The other method for obtaining a similar low pass effect is to use a one-dimensional diffraction grating which produces a diffraction phenomenon in the direction perpendicular to the longitudinal direction of the one-dimensional image pickup device. This method also permits obtaining an effect of aspherical surface by controlling a groove pitch on the diffraction grating, thereby more effectively lowering MTFs for components having optional spatial frequencies.

Further, still another method to obtain a similar low pass effect is to use a gradient index type optical element which has a refractive index distribution in the direction perpendicular to the longitudinal direction of the one-dimensional image pickup device. In this case, an effect which is equivalent to that of an aspherical surface can be obtained by varying a refractive index distribution of the gradient index type optical element, chromatic aberration can be controlled by selecting refractive index gradients which are different at different wavelengths and a high low pass effect is available owing to freedom which is higher than that obtainable with an aspherical surface.

It is more effective to maintain the optical low pass filter at a constant location relative to the object and the optical system at a stage to input an image while scanning the object, optical system or image pickup device and use, on the side of the object, a slit which has an optical axis common to the image pickup device and is formed in the longitudinal direction of the image pickup device.

The optical low pass filter according to the present invention has a second composition that is characterized in that it is configured so as to have an optical axis common to an imaging optical system using a one-dimensional image pickup device or as a portion of the imaging optical system for contributing to the formation of an image of an object and that it is composed of a member which is capable of differentiating angles of incidence from angles of emergence of rays only in the longitudinal direction of the image pickup device.

The optical low pass filter described above exhibits a low pass filter effect by separating an imaging location for rays in the longitudinal direction of the one-dimensional image pickup device from imaging locations for rays in the direction perpendicular to the longitudinal direction on a plane and is characterized in that the respective imaging locations are directed in the longitudinal direction of the one-dimensional image pickup device on the same plane. Accordingly, the optical low pass filter can provide, on the one-dimensional image pickup device, an effect which is similar to the low pass filter effect obtained by separating an image point in a direction perpendicular to an optical axis with a birefringent uniaxial crystal such as quartz or a phase filter utilizing the diffraction phenomenon, or exhibits a low pass effect by imaging the components in the direction perpendicular to the longitudinal direction of the optical low pass filter at a regular location and separating components in the longitudinal direction to locations in the longitudinal direction of the image pickup device.

Speaking concretely, an optical low pass filter which is configured as a portion of an imaging optical system or so as to have an optical axis common to the imaging optical system is composed of an anamorphic lens component having a refracting function only for components in the longitudinal direction of the one-dimensional image pickup device. Further, it is possible to deflect rays only in the longitudinal direction of the image pickup device and obtain a low pass effect by configuring an anamorphic surface of this anamorphic lens component as a curved surface having at least refractive powers which are different on both sides of an optical axis. Further, it is possible to effectively lower MTFs for components having optional spatial frequencies at the imaging location in the longitudinal direction by optimalizing the anamorphic surface. It is more effective to obtain freedom for correction of aberrations by using an aspherical surface as the anamorphic surface.

Further, another method to differentiate angles of incidence from angles of emergence only in the longitudinal direction of the one-dimensional image pickup device for obtaining a similar low pass effect is to use a one dimensional diffraction grating which produces a diffraction phenomenon in the longitudinal direction of the one-dimensional image pickup device. When this method is selected, it is also possible to obtain an aspherical surface effect by controlling a groove pitch on the diffraction grating, thereby further lowering MTFs for components having desired spatial frequencies.

Furthermore, the function described above or a similar effect can be obtained by a still another method to use a gradient index type optical element which has a refractive index distribution in the longitudinal direction of the one-dimensional image pickup device. This method makes it also possible to obtain an effect similar to that obtainable with an aspherical surface by varying the refractive index distribution and control chromatic aberration by selecting refractive index gradients which are different at different wavelengths, thereby obtaining freedom larger than that available with an aspherical surface and a higher low pass effect.

When the method to use the diffraction grating or the gradient index type optical element is selected, it is desirable that the diffraction phenomenon or the refractive index distribution is not symmetrical with regard the optical axis and that at least refractive powers are different on both sides of the optical axis. When the diffraction phenomenon or the refractive index distribution is symmetrical with regard to the optical axis, an image cannot be separated in the longitudinal direction on an image surface and a low pass effect cannot be obtained.

Further, it is effective to use, on the side of the object, cross-shaped slits which are kept at constant locations relative to the image pickup device at a stage to input an image into the image pickup device while scanning the object, optical system or the image pickup device, open in the longitudinal direction of the image pickup device and the direction perpendicular thereto and have an intersection on the optical axis of the image pickup device.

Now, embodiments of the optical low pass filter according to the present invention will be described with reference to the accompanying drawings.

Figure 1B:
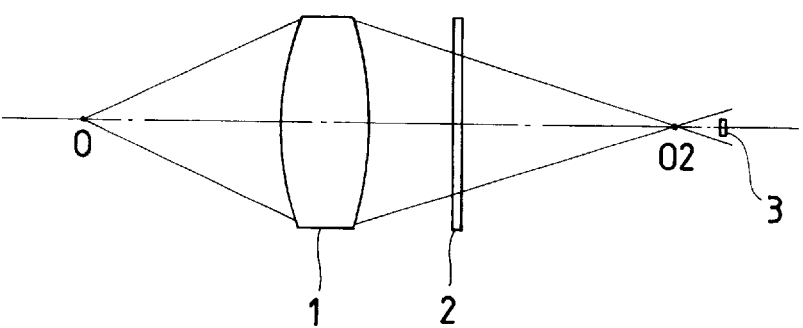

FIGS. 1A and 1B show sectional views illustrating the first composition of the optical low pass filter according to the present invention: FIG. 1A showing a sectional view on a y-z plane and FIG. 1B showing a sectional view on an x-z plane.

In FIGS. 1A and 1B showing a composition of an optical system, a reference numeral 1 represents an imaging optical system, a reference numeral 2 designates an optical low pass filter, a reference numeral 3 denotes a one-dimensional image pickup device, a reference symbol O represents an object point, and reference symbols O1 and O2 designate image points respectively.

Figure 2A:
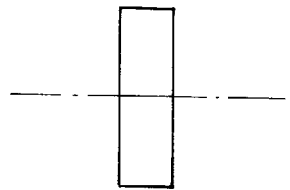
FIGS. 2A and 2B show sectional views illustrating a sectional shape of a cylindrical lens component used in the first composition of the optical low pass filter according to the present invention.
Figure 2B:
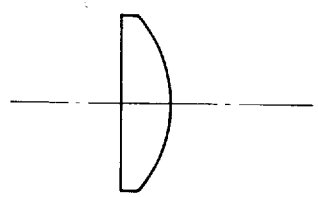

FIGS. 2A and 2B are sectional views exemplifying an optical low pass filter used in the optical system shown in FIGS. 1A and 1B wherein a cylindrical lens component is used as an anamorphic optical system. FIG. 2A shows a sectional view taken on the y-z plane, whereas FIG. 2B shows a sectional view taken on the x-z plane.

Figure 3A:
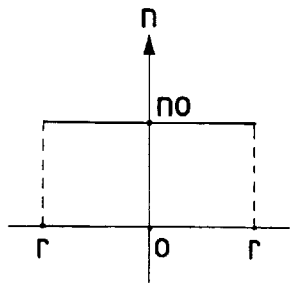
FIGS. 3A and 3B show graphs illustrating refractive index distributions of a gradient index type optical element to be used in the optical low pass filter according to the present invention which has the first composition.
Figure 3B:
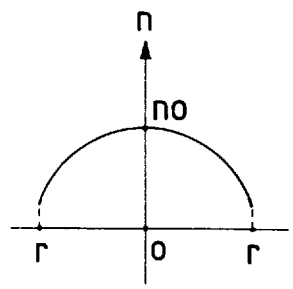

FIGS. 3A and 3B show refractive index distributions of an optical low pass filter composed of a gradient index lens component which has refractive index distributions in the longitudinal direction of the image pickup device and the direction perpendicular thereto. FIG. 3A shows the refractive index distribution on the y-z plane, whereas FIG. 3B shows the refractive index distribution on the x-z plane.

Figure 4:
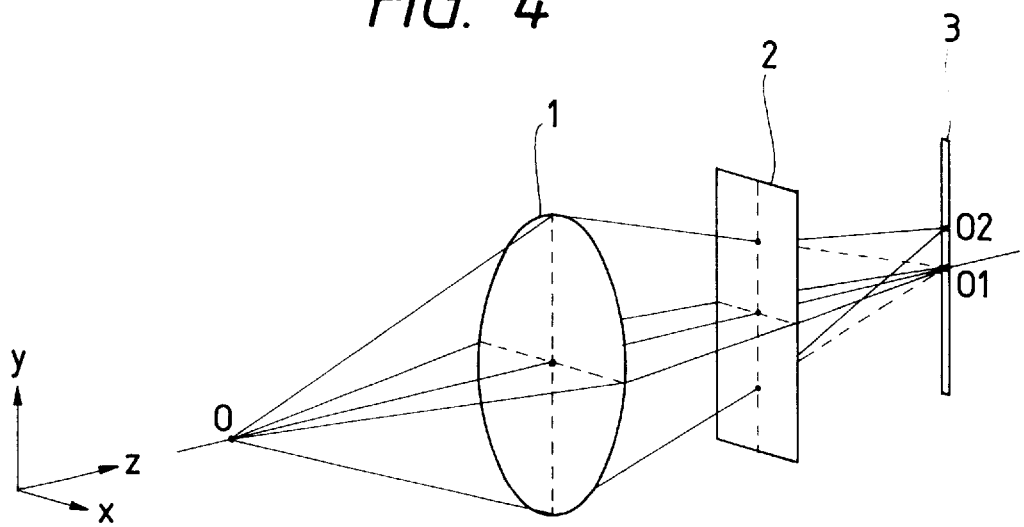
FIG. 4 shows a perspective view illustrating a composition of an optical system using the optical low pass filter according to the present invention which has a second composition.

FIG. 4: FIGS. 5A, 5B: FIGS. 6A, 6B: FIGS. 7A, 7B: and FIGS. 8A, 8B illustrate the second composition of the optical low pass filter according to the present invention. In FIG. 4, a reference numeral 1 represents an imaging optical system, a reference numeral 2 designates the optical low pass filter according to the present invention and a reference numeral 3 denote a one-dimensional image pickup device.

FIGS. 5A and 5B show a sectional shape of a cylindrical lens component which is used as an anamorphic optical system in the second composition described above. FIG. 5A shows a sectional shape on the y-z plane, whereas FIG. 5B shows a sectional shape on the x-z plane.

FIGS. 6A and 6B show a sectional shape of another example of a cylindrical lens component to be used in the second composition of the optical low pass filter according to the present invention. FIG. 6A shows a sectional shape on the y-z plane, whereas FIG. 6B shows a sectional shape on the x-z plane.

FIGS. 7A and 7B show graphs illustrating refractive index distributions of a gradient index lens component used as an optical low pass filter having the second composition. FIG. 7A shows a refractive index distribution on the y-z plane, whereas FIG. 7B shows a refractive index distribution on the x-z plane.

FIGS. 8A and 8B show refractive index distributions of another example of a gradient index type optical element used as the optical low pass filter according to the present invention which has the second composition. FIG. 8A shows a refractive index distribution on the y-z plane, whereas FIG. 8B shows a refractive index distribution on the x-z plane.

The optical low pass filter according to the present invention has a simple composition, can be manufactured at a low cost, exhibits a desired low pass effect and is suited for use in optical systems which use one-dimensional image pickup devices in particular even when the optical low pass filter has either the first composition or the second composition described above.

I claim:

1. An optical low pass filter having an optical axis common to an imaging optical system for forming an image on a one-dimensional image pickup device or configured as a portion of an imaging optical system for forming an image on a one-dimensional image pickup device, wherein said optical low pass filter is configured so as to image components in a longitudinal direction at a desired imaging location and has refractive powers, for components in different directions, which are different from that for said components in the longitudinal direction or images components having optional spatial frequencies at different imaging locations.

2. An optical low pass filter according to claim 1 wherein said low pass filter is an anamorphic optical system, and wherein an axis of a coordinates system on an anamorphic surface of said anamorphic optical system is aligned with the longitudinal direction of said image pickup device.

3. An optical low pass filter according to claim 2 wherein an aspherical surface is formed on said anamorphic optical system.

4. An optical low pass filter having an optical axis common to an imaging optical system for forming an image on a one-dimensional image pickup device or configured as a portion of the imaging optical system for forming an image on a one-dimensional image pickup device, wherein said optical low pass filter is capable of varying angles of incidence and angles of emergence of rays only in a longitudinal direction of said image pickup device.

5. An optical low pass filter according to claim 4 wherein said low pass filter is an anamorphic optical system which deflects rays only in the longitudinal direction of said one-dimensional image pickup device.

6. An optical low pass filter according to claim 5 wherein said anamorphic optical element has an aspherical surface.

7. An optical low pass filter having an optical axis common to an imaging optical system for forming an image on a one-dimensional image pickup device or configured as a portion of the imaging optical system, wherein said optical low pass filter is capable of varying angles of incidence and angles of emergence of rays only in a longitudinal direction of said image pickup device, wherein said low pass filter is a diffraction grating which produces a diffraction phenomenon in the longitudinal direction of said one-dimensional image pickup device.

8. An optical low pass filter according to claim 7 configured to exhibit an aspherical surface effect by controlling a groove pitch on said diffraction grating.

9. An optical low pass filter having an optical axis common to an imaging optical system for forming an image on a one-dimensional image pickup device or configured as a portion of an imaging optical system for contributing to formation of an image of an object, wherein said optical low pass filter is configured so as to image components in a longitudinal direction at a desired imaging location and has refractive powers, for components in different directions, which are different from that for said components in the longitudinal direction or images components having optional spatial frequencies at different imaging locations, and wherein said low pass filter is a gradient index type optical element having a refractive index distribution in a direction perpendicular to the longitudinal direction of said image pickup device.

10. An optical low pass filter according to claim 9 configured to exhibit an aspherical surface effect by varying the refractive index distribution of said gradient index type optical element.

11. An optical low pass filter according to claim 9 or 8 configured to control chromatic aberration by selecting refractive index distributions that are different at different wavelengths for said gradient index type optical element.

12. An optical low pass filter wherein said low pass filter is a diffraction grating which produces a diffraction phenomenon in the longitudinal direction of said one-dimensional image pickup device.

13. An optical low pass filter according to claim 12 configured to exhibit an aspherical surface effect by controlling a groove pitch on said diffraction grating.

14. An optical low pass filter having an optical axis common to an imaging optical system for forming an image on a one-dimensional image pickup device or configured as a portion of the imaging optical system, wherein said optical low pass filter is capable of varying angles of incidence and angles of emergence of rays only in a longitudinal direction of said image pickup device, and wherein said low pass filter is a gradient index type optical element having a refractive index distribution in the longitudinal direction of said one-dimensional image pickup device.

15. An optical low pass filter according to claim 14 configured to exhibit an aspherical surface effect by varying the refractive index distribution of said gradient index type optical element.

16. An optical low pass filter according to claim 14 or 15 configured to control chromatic aberration by selecting refractive index distributions that are different at different wavelengths for said gradient index type optical element.

17. An optical low pass filter having an optical axis that is common to an imaging optical system for forming an image on a one-dimensional image pickup device for contributing to the formation of an image of an object, wherein said optical low pass filter images components in a longitudinal direction of said image pickup device at a desired imaging location and has refractive powers, for components in directions that are different from that of said components, which are different from that for the components in the longitudinal direction of said image pickup device or images components having optional spatial frequencies at different imaging locations.

18. An optical low pass filter configured as a portion of an imaging optical system for forming an image on a one-dimensional image pickup device, wherein said optical low pass filter images components in a longitudinal direction of said image pickup device at a desired imaging location and has refractive powers, for components in directions that are different from that of said components, which are different from that for the components in the longitudinal direction of said image pickup device or images components having optional spatial frequencies at different imaging locations.

* * * * *